(12) United States Patent
Goedel

(10) Patent No.: US 8,806,934 B2
(45) Date of Patent: Aug. 19, 2014

(54) METHOD AND ASSEMBLY FOR HIGH ANGLE OF ATTACK PROCESS PARAMETER SENSORS

(75) Inventor: Jarodd Dan Goedel, Sherburne, NY (US)

(73) Assignee: Unison Industries, LLC, Jacksonville, FL (US)

( * ) Notice: Subject to any disclaimer, the term of this patent is extended or adjusted under 35 U.S.C. 154(b) by 397 days.

(21) Appl. No.: 13/105,635

(22) Filed: May 11, 2011

(65) Prior Publication Data

US 2012/0285261 A1  Nov. 15, 2012

(51) Int. Cl.
*G01F 1/68* (2006.01)
(52) U.S. Cl.
USPC ........................................... 73/204.22
(58) Field of Classification Search
USPC ............................. 73/204.22, 202.5
See application file for complete search history.

(56) References Cited

U.S. PATENT DOCUMENTS

| | | | |
|---|---|---|---|
| 3,925,979 | A | 12/1975 | Ziegler |
| 4,972,672 | A | 11/1990 | Sanderson et al. |
| 5,484,122 | A | 1/1996 | DeSalve |
| 7,845,222 | B1 | 12/2010 | Goedel et al. |
| 2005/0232331 | A1* | 10/2005 | Severson ..................... 374/128 |
| 2006/0056489 | A1 | 3/2006 | Bernard et al. |
| 2008/0053100 | A1 | 3/2008 | Venkataramani et al. |
| 2009/0308076 | A1 | 12/2009 | Nims |

FOREIGN PATENT DOCUMENTS

WO    9425842 A1    11/1994

OTHER PUBLICATIONS

Extended European Search Report, dated May 14, 2014, for co-pending EP patent application No. EP 12167225 (6 pgs).

* cited by examiner

*Primary Examiner* — Lisa Caputo
*Assistant Examiner* — Brandi N Hopkins
(74) *Attorney, Agent, or Firm* — William Scott Andes, Esq.; Armstrong Teasdale LLP

(57) ABSTRACT

A method and an assembly for sensing a process parameter are provided. The sensing assembly includes a base and a sensor assembly. The sensor assembly includes a sensing element, a first flow channel, and a second flow channel. The first flow channel includes a converging segment, a straightening segment, and a turning segment wherein the turning segment includes a turn radius configured to separate particles from a flow entering the turning segment and the second flow channel is configured to generate a low pressure area downstream of the sensing element. The sensing assembly also includes an extension member extending between the base and the sensor assembly.

20 Claims, 4 Drawing Sheets

METHOD AND ASSEMBLY FOR HIGH ANGLE OF ATTACK PROCESS PARAMETER SENSORS

BACKGROUND OF THE INVENTION

The field of the invention relates generally to process parameter sensing devices and more specifically, to an assembly and method of sensing a process parameter.

At least some known total air temperature (TAT) sensors are limited in their ability to maintain accurate measuring capability at high angles of attack. An airfoil channeling airflow towards a sensing element of the sensor can cause a flow separation on the airfoil if the angle of attack increased beyond a certain angle for example, +/−15 degrees. The separation can result in an extreme recovery error and convective film variation.

BRIEF DESCRIPTION OF THE INVENTION

In one embodiment, a sensing assembly includes a base and a sensor assembly. The sensor assembly includes a sensing element, a first flow channel, and a second flow channel. The first flow channel includes a converging segment, a straightening segment, and a turning segment wherein the turning segment includes a turn radius configured to separate particles from a flow entering the turning segment and the second flow channel is configured to generate a low pressure area downstream of the sensing element. The sensing assembly also includes an extension member extending between the base and the sensor assembly.

In another embodiment, a method of sensing a process parameter includes channeling a flow of fluid through a first flow passage defined between a first airfoil body and a center airfoil body, channeling the flow of fluid through a second flow passage defined between a second airfoil body and the center airfoil body, turning the flow of fluid in the first flow passage to facilitate separating the flow of fluid in the first flow passage into a first stream having relatively reduced particulates with respect to a second stream, and directing the first stream to a sensor element.

In yet another embodiment, a process sensing system includes a first extension member and a second extension member extending parallelly from a base and spaced apart by a flow channel and a sensor assembly extending between the first and second extension members. The sensor assembly includes a center airfoil body and a sensor element positioned downstream of the center airfoil body, a first airfoil body spaced apart from the center airfoil body by a first flow channel, the first airfoil body including a concave surface facing the center airfoil body, and a second airfoil body spaced apart from the center airfoil body by a second flow channel, the second airfoil body including a convex surface facing the center airfoil body.

BRIEF DESCRIPTION OF THE DRAWINGS

FIG. 1 is a perspective view of a sensing assembly in accordance with an exemplary embodiment of the present invention;

FIG. 2 is a plan view of the extension member shown in FIG. 1 taken along lines 2-2 also shown in FIG. 1;

FIG. 3 is a side elevation view of sensor assembly shown in FIG. 1 taken along lines 3-3 also shown in FIG. 1; and FIG. 4 is a flow diagram of a method of sensing a process parameter.

DETAILED DESCRIPTION OF THE INVENTION

Figure 1:
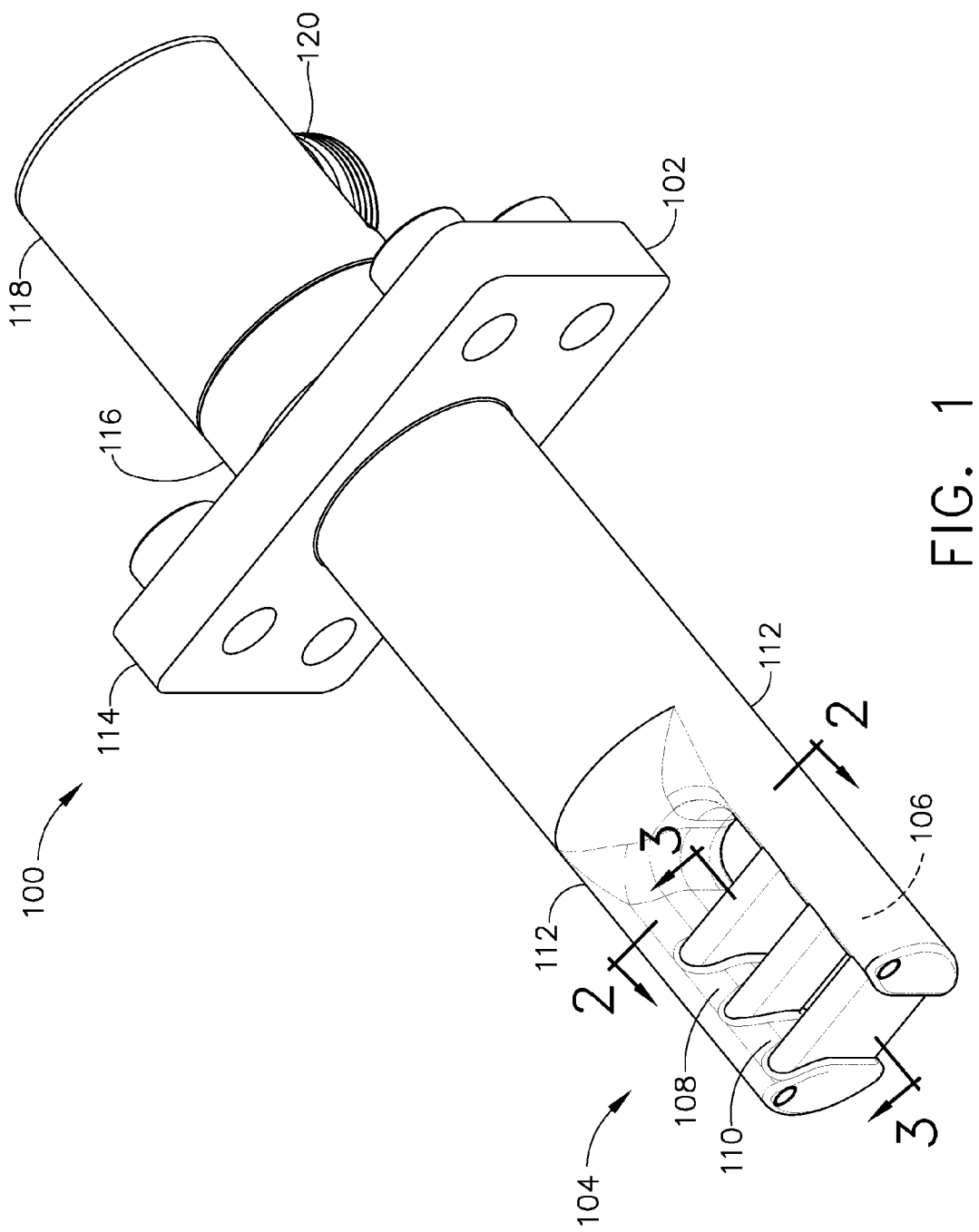
FIGS. 1-4 show exemplary embodiments of the method and assembly described herein.

The following detailed description illustrates embodiments of the invention by way of example and not by way of limitation. It is contemplated that the invention has general application to analytical and methodical embodiments of sensing process parameters in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention describe a gas turbine engine fan inlet temperature sensor capable of operating accurately over an angle of attack range of ±30°. The fan inlet temperature sensor described herein uses a symmetrical airfoil for the extension member that extends from a wall of the fan inlet, however embodiments of the invention are not to be limited to only symmetrical airfoils. Flow separation on the extension member airfoil at large angles of attack can result in an extreme recovery error, time response, and convective film variation. Managing the flow separation is critical in consistent sensor performance especially at higher mach numbers. Embodiments of the present invention straighten the airflow that reaches the sensing element using a "V" channel with rounded tip profiles.

The "V" channel forces air to directly impinge on the sensing element, because the airfoil is symmetrical, the air flow stays attached to the wall of the "V" channel until the angle of attack reaches approximately ±50°. The flow path generates an area of high pressure as well as an area of low pressure. This pressure differential forces the air flow to change direction. This direction change ensures the massive water particles and dust particles can not directly impact the sensing element. The mass of the water and dust is so large that momentum of these particles makes it impossible to make the same sharp turn that the air flow is able to make. After the air flow has been turned, and the water and dust have been separated out of the air flow, the air flow is channeled into an outer sheath over the sensing element. The outer sheath decreases the air velocity around the sensing element, this reduction in air velocity raises the temperature of the air to almost that of the true total temperature. The difference between the sensed temperature and that of the true total temperature of the air is then used to calculate the recovery error of the sensor. The outer sheath also promotes a large uniform convective film on the outside of the sensing element. This large uniform convective film decreases the transient response of the sensing element as well as reduces excitation error and conduction error. The pressure differential that drives airflow to the sensing element is generated using three relatively smaller airfoils.

The fan inlet temperature sensing element is a resistance temperature detector (RTD) that measures the engine inlet total air temperature. It is a hermetically sealed, dual element, electrical device that exhibits a change in resistance proportional to air temperature changes. Signals from both elements are routed to the Full Authority Digital Engine Control (FADEC). A single electrical connector provides the electrical interface. The sensor assembly uses electric heaters powered by the electric anti-ice system to prevent the formation of ice on the sensor assembly housing under service conditions. In various embodiments, the sensor assembly is constructed from hardened Inconel 718, which is sufficiently hard so as not to be damaged when exposed to sand and dust particle impingement. The area most susceptible to sand and dust impingement, the sensing element, is protected by a center airfoil body of the sensor assembly. All water and sand particles are separated out by the airfoil design.

FIG. 1 is a perspective view of a sensing assembly 100 in accordance with an exemplary embodiment of the present invention. In the exemplary embodiment, sensing assembly 100 includes a base 102 and a sensor assembly 104. Sensor assembly 104 includes a sensing element 106 (not visible in FIG. 1), a first flow channel 108 and a second flow channel 110. Sensor assembly 104 also includes an extension member 112 extending between base 102 and sensor assembly 104. Base 102 includes a flange 114 and a boss 116. Flange 114 is configured to couple sensing assembly 100 to a wall of a process conduit, for example, an inlet duct of a gas turbine engine. Boss 116 is configured to receive electrical wiring within to permit coupling electrical components within sensing assembly 100 to power sources and/or control devices (not shown). A connector housing 118 is configured to matingly engage boss 116. Connector housing 118 includes a connector 120 through which wires pass from connector housing 118 to a cable (not shown).

Figure 2:
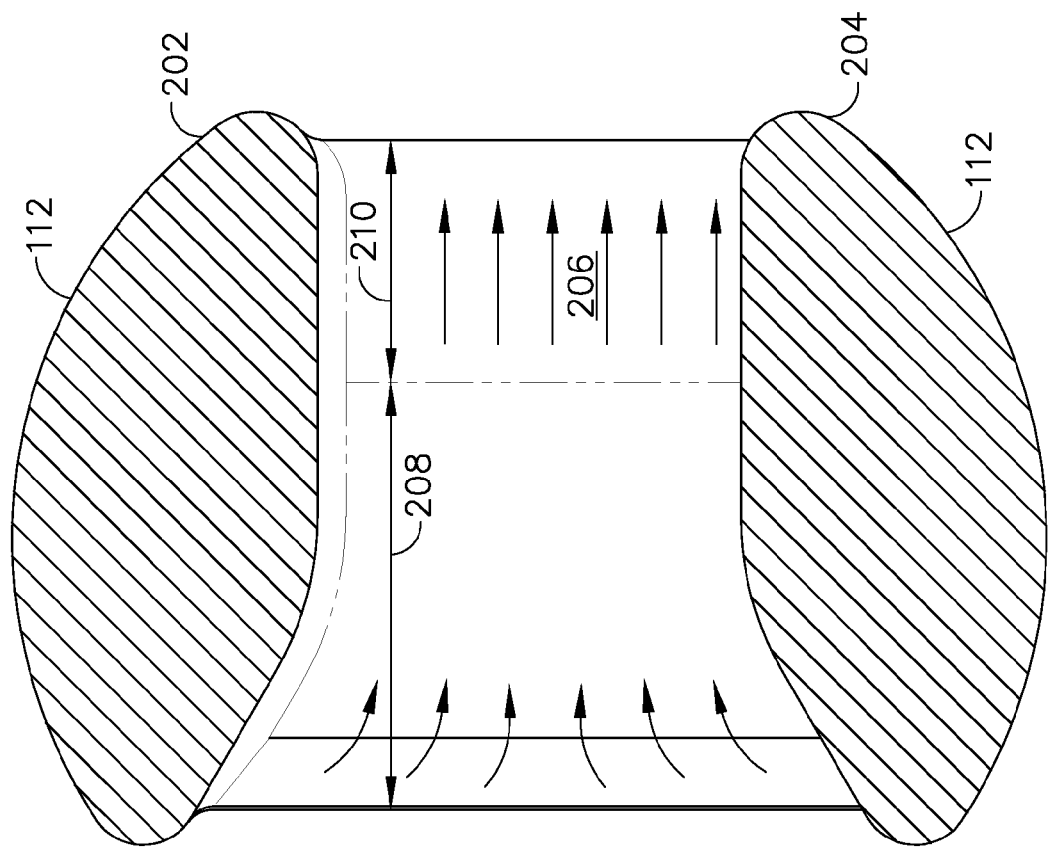

FIG. 2 is a plan view of extension member 112 (shown in FIG. 1) taken along lines 2-2 (also shown in FIG. 1). In the exemplary embodiment, extension member 112 includes a first leg 202 and a second leg 204 that defines a flow channel 206 therebetween. Flow channel 206 includes a converging V-channel segment 208 upstream with respect to a straightening segment 210. A flow of fluid 212 enters converging V-channel segment 208 and is accelerated into straightening segment 210.

Figure 3:
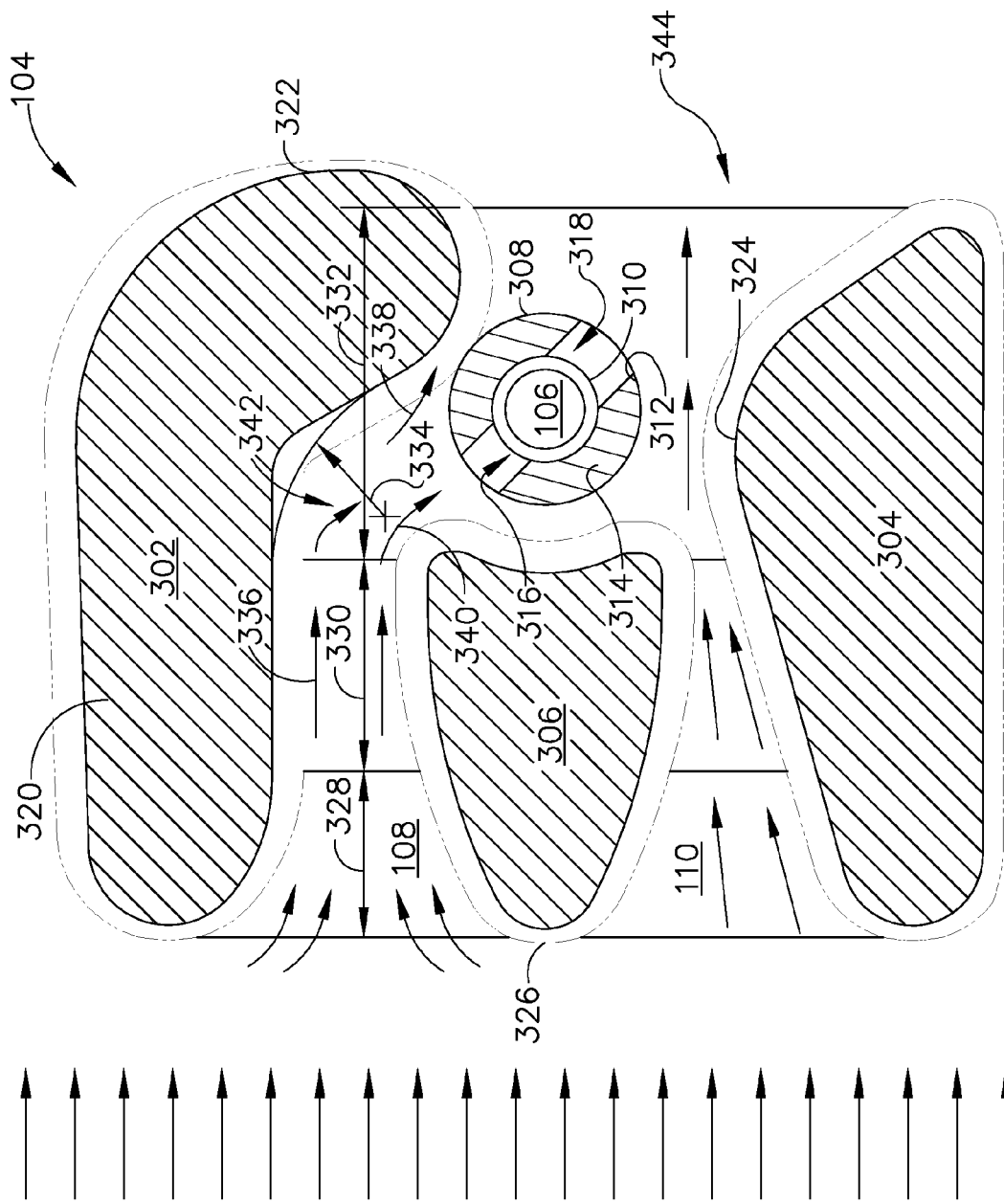

FIG. 3 is a side elevation view of sensor assembly 104 (shown in FIG. 1) taken along lines 3-3 (also shown in FIG. 1). In the exemplary embodiment, sensor assembly 104 includes a first airfoil body 302, a second airfoil body 304, and a center airfoil body 306. Also in the exemplary embodiment, first airfoil body 302, second airfoil body 304, and center airfoil body 306 extend orthogonally with respect to extension member 112. In one embodiment, extension member 112 is oriented vertically when properly installed for use and therefore first airfoil body 302, second airfoil body 304, and center airfoil body 306 are oriented substantially horizontally when properly installed for use. During operation however, in certain applications sensing assembly 100 may be operated at pitch angles that change the orientation of extension member 112, first airfoil body 302, second airfoil body 304, and center airfoil body 306 with respect to the vertical and horizontal orientations. In addition, certain operating conditions cause airflow to enter sensor assembly 104 at various angles, including up to approximately 50° incline and decline (pitch) and/or a rotation about sensor assembly 104 (yaw).

Sensor assembly 104 further includes sensing element 106 and a sheath 308 that at least partially surrounds sensing element 106. In the exemplary embodiment, sensing element 106 has a substantially cylindrical body and sheath 308 is also substantially cylindrical. An outer surface 310 of sensing element 106 and an inner surface 312 of sheath 308 define a gap 314 between them. A first upstream opening 316 in sheath 308 permits fluid entry into gap 314 and a second downstream opening 318 in sheath 308 permits fluid egress from gap 314.

First airfoil body 302 includes a substantially J-shaped cross-section with a longer leg 320 of the "J" aligned into the direction of fluid flow and a shorter leg 322 oriented towards second airfoil body 304. First airfoil body 302 includes a concave surface facing center airfoil body 306. Second airfoil body 304 includes a triangular cross-section with an apex 324 of the triangle proximate sensing element 106 and sheath 308. Second airfoil body 304 includes a convex surface facing center airfoil body 306. Center airfoil body 306 includes a substantially isosceles triangle shape with an apex 326 of center airfoil body 304 aligned into the direction of fluid flow.

First airfoil body 302 and center airfoil body 306 define first flow channel 108 to include a converging segment 328, a straightening segment 330, and a turning segment 332. Turning segment 332 includes a turn radius 334 configured to separate particles from a flow 336 entering turning segment 332. As flow 336 enters turning segment 332 and begins to turn, particles, moisture droplets, and ice, because of their momentum, will not be able to turn as rapidly as the fluid itself. Accordingly, flow 336 will separate into a particle-laden stream 338 and a particle-reduced stream 340. Particle-laden stream 338 will pass between sheath 308 and first airfoil body 302 and not be introduced into gap 314 or impinge sensing element 106. Particle-reduced stream 340 will be able to turn sufficiently to be directed into upstream opening 316 to be measured by sensing element 106. Flow 336 is facilitated being introduced into opening 316 by an area 342 of relatively high pressure generated in turning segment 332 by a shape of flow channel 108. Area 342 is generated upstream from sensing element 106 in turning segment 332.

Second airfoil body 304 and center airfoil body 306 define second flow channel 110 therebetween. Second flow channel 110 is configured to generate a low pressure area 344 downstream of sensing element 106.

Figure 4:
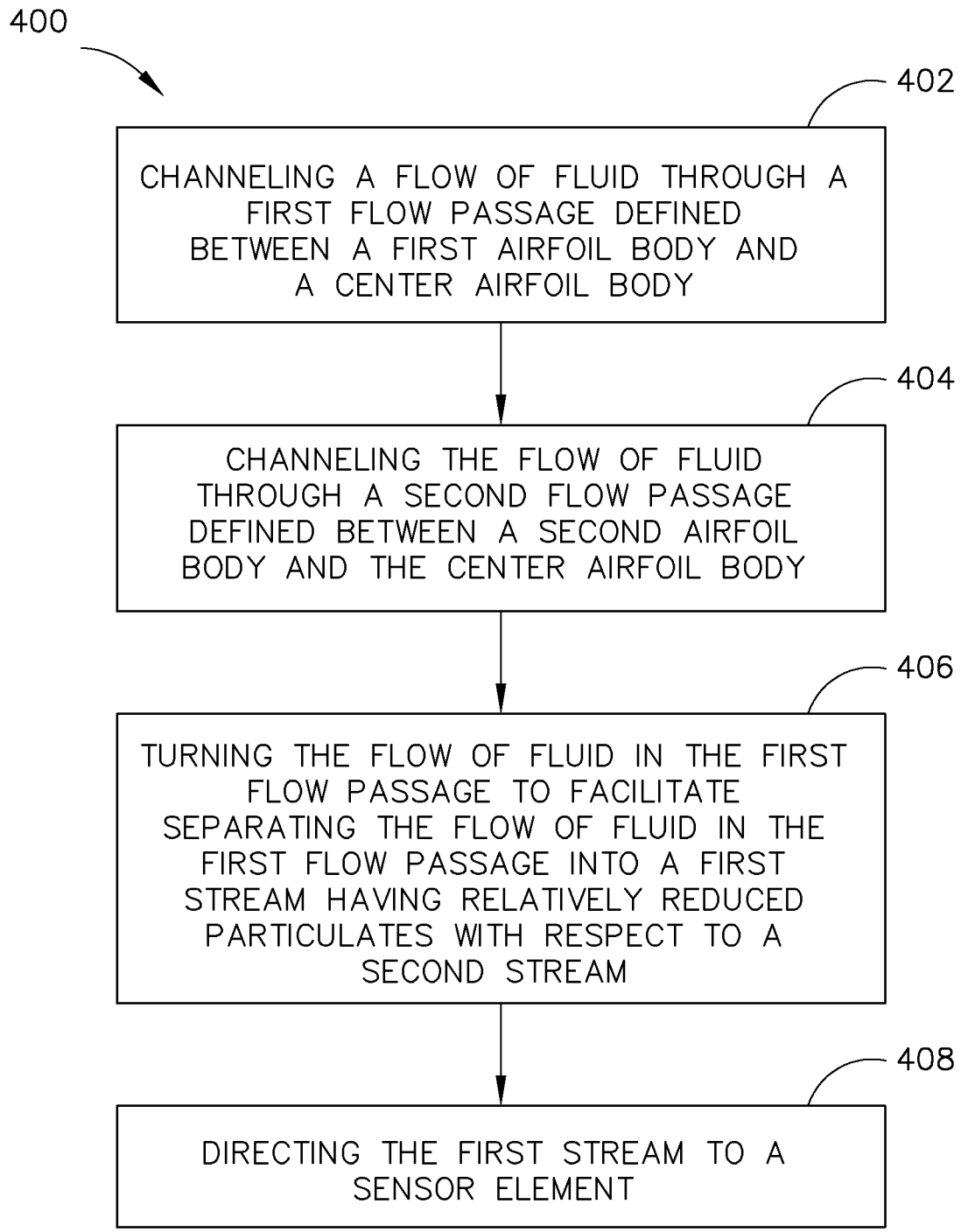

FIG. 4 is a flow diagram of a method 400 of sensing a process parameter. In the exemplary embodiment, method 400 includes channeling 402 a flow of fluid through a first flow passage defined between a first airfoil body and a center airfoil body, channeling 404 the flow of fluid through a second flow passage defined between a second airfoil body and the center airfoil body, turning 406 the flow of fluid in the first flow passage to facilitate separating the flow of fluid in the first flow passage into a first stream having relatively reduced particulates with respect to a second stream, and directing 408 the first stream to a sensor element. Method 400 optionally includes generating an area of relatively high pressure in the first flow passage and/or generating an area of relatively low pressure in the second flow passage. In various embodiments, method 400 includes reducing a velocity of the flow of fluid exiting the first flow passage proximate the sensor element. In yet other embodiments, the velocity of the flow of fluid exiting the first flow passage is reduced proximate the sensor element using a sheath surrounding the sensor element. Method 400 may also include directing the flow of fluid exiting the first flow passage into an opening in a sheath surrounding the sensor element.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for sensing a process parameter under conditions of high angle of attack while maintaining separation of particles in the measured airflow. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and assembly for sensing a process parameter provides a cost-effective and reliable means for reducing effects of direct water and/or ice impingement on the sensor, angle of attack, and time response. More specifically, the methods and assembly described herein facilitate separating water and/or ice from a flow of fluid. In addition, the above-described methods and assembly facilitate sampling a low velocity portion of the flow of fluid without moving parts in the process sensor assembly. As a result, the methods and assembly described herein facilitate measuring parameters of a process in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A sensing assembly comprising:
a base;
a sensor assembly, said sensor assembly comprising:
 a sensing element;
 a first flow channel comprising a converging segment, a straightening segment, and a turning segment, said turning segment comprising a turn radius configured to separate particles from a flow entering said turning segment; and
 a second flow channel substantially parallel to said first flow channel and configured to generate a low pressure area downstream of said sensing element; and
an extension member extending between said base and said sensor assembly wherein said extension member comprises a first leg and a parallel second leg defining a third flow channel therebetween, said third flow channel substantially parallel to said first and second flow channels.

2. A sensing assembly in accordance with claim 1, wherein said third flow channel comprises a converging segment and a straightening segment.

3. A sensing assembly in accordance with claim 2, wherein a cross-section of each leg is symmetrical with respect to each other about a centerline of said third flow channel.

4. A sensing assembly in accordance with claim 1, wherein said sensing element of said sensor assembly further comprises a sheath at least partially surrounding said sensing element.

5. A sensing assembly in accordance with claim 1, wherein said sensing element of said sensor assembly further comprises a sheath comprising an inlet opening and an outlet opening spaced circumferentially about said sheath.

6. A sensing assembly in accordance with claim 1, wherein said first flow channel is defined by a first airfoil body and a center airfoil body.

7. A sensing assembly in accordance with claim 6, wherein said first airfoil body and center airfoil body, each extending orthogonally with respect to said extension member.

8. A sensing assembly in accordance with claim 6, wherein said first airfoil body comprises a J-shaped cross-section.

9. A sensing assembly in accordance with claim 1, wherein said second flow channel is defined by a second airfoil body and a center airfoil body, each airfoil body extending orthogonally with respect to said extension member.

10. A method of sensing a process parameter, said method comprising:
channeling a flow of fluid through a first flow passage defined between a first leg and a second parallel leg of an extension member;
channeling the flow of fluid through a second flow passage defined between a first airfoil body and a center airfoil body;
channeling the flow of fluid through a third flow passage defined between a second airfoil body and the center airfoil body, wherein the first, second, and third flow passages are each substantially parallel to each other;
turning the flow of fluid in the second flow passage to facilitate separating the flow of fluid in the second flow passage into a first stream having relatively reduced particulates with respect to a second stream; and
directing the first stream to a sensing element.

11. A method in accordance with claim 10, further comprising generating an area of relatively high pressure in the second flow passage.

12. A method in accordance with claim 10, further comprising generating an area of relatively low pressure in the third flow passage.

13. A method in accordance with claim 10, further comprising reducing a velocity of the flow of fluid exiting the second flow passage proximate the sensing element.

14. A method in accordance with claim 10, further comprising reducing a velocity of the flow of fluid exiting the second flow passage proximate the sensing element using a sheath surrounding the sensing element.

15. A method in accordance with claim 10, further comprising directing the flow of fluid exiting the second flow passage into an opening in a sheath surrounding the sensing element.

16. A process sensing system comprising:
an extension member comprising a first leg and a parallel second leg defining a first flow channel therebetween; and
a sensor assembly extending between said first and second legs, said sensor assembly comprising:
 a center airfoil body and a sensing element positioned downstream of said center airfoil body;

a first airfoil body spaced apart from said center airfoil body by a second flow channel, said first airfoil body comprising a concave surface facing said center airfoil body; and a second airfoil body spaced apart from said center airfoil body by a third flow channel, said second airfoil body comprising a convex surface facing said center airfoil body, wherein said first, said second, and said third flow channels are each substantially parallel to each other.

17. A process sensing system in accordance with claim 16, wherein each of said first and second legs include a leading portion that defines a converging V-shaped channel between said first and second leg leading portions.

18. A process sensing system in accordance with claim 16, wherein said first airfoil body and said center airfoil body are configured to separate a flow of fluid through said second flow channel into a first stream having relatively reduced particulates with respect to a second stream.

19. A process sensing system in accordance with claim 18, wherein said sensing element comprises a sheath circumscribing said sensing element, said sheath comprising an upstream opening aligned with said first stream.

20. A process sensing system in accordance with claim 19, wherein said sheath comprises a downstream opening diametrically opposed to said upstream opening.

\* \* \* \* \*

UNITED STATES PATENT AND TRADEMARK OFFICE
CERTIFICATE OF CORRECTION

Page 1 of 1

PATENT NO. : 8,806,934 B2
APPLICATION NO. : 13/105635
DATED : August 19, 2014
INVENTOR(S) : Goedel It is certified that error appears in the above-identified patent and that said Letters Patent is hereby corrected as shown below:

In the Claims

In Column 5, Line 61, in Claim 1, delete "assembly" and insert -- assembly, --, therefor.

Signed and Sealed this
Second Day of June, 2015

Michelle K. Lee
*Director of the United States Patent and Trademark Office*